United States Patent Office

3,421,487
Patented Jan. 14, 1969

3,421,487
FUEL METERING APPARATUS FOR AN ENGINE
Jean G. Cadiou, Paris, France, assignor to Societe Anonyme Andre Citroen, Paris, France, a French society
Filed Sept. 30, 1966, Ser. No. 583,331
Claims priority, application France, Oct. 19, 1965, 35,264
U.S. Cl. 123—140           13 Claims
Int. Cl. F02d *1/06;* F02m *7/00;* F02b *33/00*

ABSTRACT OF THE DISCLOSURE

Apparatus for metering the amount of fuel injected into an internal combustion engine, comprising a continuous or pulsatory pump forcing fuel under high pressure through a jet and adjusting the output with the aid of the regulation of the pressure drop across the jet by means of movable metering piston exposed on opposite ends to the pressure picked up upstream and downstream of the jet and subjected to a force opposing the resultant of the pressures and wherein a counterpressure is effected in a return circuit downstream of the metering piston and acts against the piston so that the opposing force applied to the piston is made to vary in proportion to this counterpressure. The counterpressure being produced by a throttling device at normal speeds of the engine, the movement of which depends upon the supply of air taken in by the engine and the mean value of the counterpressure being constant for a given supply of air, and the counterpressure being produced by an additional jet at the idle speed of the engine.

---

The present invention relates to a device for determining the supply of fuel such as gasoline injected into an engine and intended for ensuring a constant relationship between the weight-air supply induced by this engine and the supply of fuel, the weight-air supply being measured by a suction creating apparatus of the Venturi type. The depression provided by the Venturi is applied to a diaphragm which, by means of suitable devices, enables the difference of the pressures on either side of a fuel metering jet to be regulated in proportion to the depression which the weight-air supply measures.

These devices are generally placed in continuous-feed fuel lines, the determined amount of fuel then flowing in a generally pulsatory manner to the end of the line by one or more atomisers in the induction tubes of the engine.

The apparatus according to the invention on the contrary may be supplied by a pump whose operational cycle is repeated at each injection, the quantity injected being controlled during each cycle, and the excess fuel returned into a return pipe. However, it will be noted that this apparatus also adapts itself to a supply by means of a pump with a continuous or slight pulsatory flow.

The apparatus according to the invention may be used on all types of gasoline fuel engines and ensures that they are correctly supplied with fuel whatever their running conditions may be. It being understood that the running conditions encountered may vary greatly, and that such variations are most rapid on the engines for motor vehicles, the following description will be devoted to the case of the use of a metering device for a motor vehicle, but this does not of course imply any limitation to the scope of the invention.

The metering device must, in operation, be associated with an injection pump and a fuel distributing device, which will preferably be those forming the object of patent applications filed by the applicant company on April 16, 1965, and June 24, 1965, under the respective titles "Fuel Injection Pumps" and "Fuel Distributor Intended to be Associated With an Injection Pump."

It will be understood that, during the operation of a motor vehicle engine, the engine is capable of being in three main running conditions which will be known as: normal speed, idle and "driven engine" speed during which the vehicle causes the engine to rotate at a speed greater than that which corresponds to the position, at the same moment, of the acceleration pedal and the air input throttle valve.

The metering device according to the invention permits an effective operation in the above three speed conditions, the basic arrangement being suitable for normal speed, and correcting means which work automatically being provided for the idle speed or for the driven engine speed.

Devices for metering fuel pumped by an intermittently acting pump have already been disclosed, in particular wherein the fuel passes through a metering jet across which a metering chamber is connected and containing an adjustable and movable metering piston whose two end faces are exposed to the pressure $P_1$ upstream and $P_2$ downstream. The upstream face of this piston regulates the passage section of an aperture opening out into a return pipe to the fuel tank. The position of the piston is determined by an external parameter such as the vacuum prevailing in the suction tube. To this end, a diaphragm subjected to this vacuum, is mechanically connected by means of a system of rods, to the metering piston.

A device of this kind has a number of disadvantages. Firstly, it is not very suitable to effect, by means of a mechanical transmission, the exact and high relationship of the lever arms which must necessarily correspond to that of the pressures used which go from the order of about 100 grams per sq. cm. on the one hand, to about ten kilograms per sq. cm. on the other hand. In addition, for a given demand from the engine for fuel, there is a definite position of the piston which is imposed thereon by rigid components exerting a constant stress. Under these conditions, the instantaneous variations of pressure in the pump, mainly when it is a question of a pump with intermittent lift, which affect pressures $P_1$ and $P_2$, produce, at least at the high frequencies corresponding to the high speeds of rotation of the engine, fuel supplies greater than those which are necessary without any corresponding correcting variation being given to the constant stress determining the position of the piston, and consequently the control of the fuel mixture.

The invention has for an object, removing or minimising these disadvantages; a further object is to effect a considerable, precise and flexible amplification of the parameter controlling the supply of injected fuel, for example, the vacuum picked up in the induction tube, and furthermore to permit a precise metering to be obtained which remains independent of the fluctuations of the pressure produced by the injection pump.

According to the method of the invention, a counterpressure is effected in the escape circuit downstream of the metering piston and this counterpressure is used as a means for regulating the fuel supply lost by causing it to act in opposition to the drop in pressure at the metering jet.

In normal running conditions, the counterpressure is produced by reducing the return of the fluid to the supply as a function of the supply of air consumed by the engine, the mean value of this counterpressure being constant for a given supply of air.

Under slowing down running conditions, the counterpressure is produced by means of a fixed jet.

The invention also relates to apparatus for carrying out the above method.

According to this aspect of the invention, a hydraulic cylinder supplied by the counterpressure existing in the return circuit, is connected to the metering piston so as to move in a direction of action opposite the resultant of the pressures on either side of the metering jet; this hydraulic cylinder will advantageously be disposed between the faces of the metering piston.

In order that the invention may be more readily understood and its secondary characteristics more readily appreciated, reference will now be made to the accompanying drawings showing the embodiment thereof, by way of example, and in which.

Figure 1:
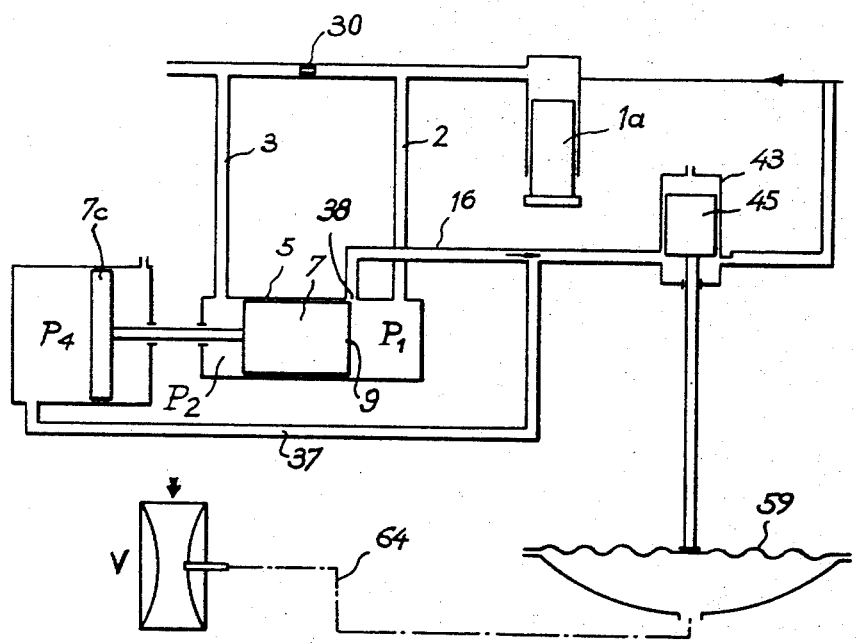
FIG. 1 shows a diagram illustrating the method of the invention.

Referring now to the drawings, FIG. 1 shows a pump $1a$ which forces fuel through a jet 30. Pipes 2 and 3 placed respectively upstream and downstream of the jet 30 lead into the ends of a cylinder 5 in which a fuel flow control or metering piston 7 is free to move axially. The extreme faces of said piston are exposed to pressures $P_1$ and $P_2$ encountered upstream and downstream of the jet 30.

The end 9 of the piston regulates the passage section of the aperture 38 of a return pipe 16 for the fuel in which is mounted a throttling device comprising a cylinder 43 in which slides a piston 45. This latter is connected to the diaphragm 59 of a component which is sensitive to vacuum, and which is itself connected by a pipe 64 to a Venturi tube V placed in the induction tube of the engine.

A counterpressure designated by $P_4$ is created in the return tube 16 by the piston 45 and is transmitted by a pipe 37 to a hydraulic cylinder whose piston $7c$ moves axially with piston 7.

For a given position of the diaphragm 59, the pistons 7 and $7c$ are balanced on the one hand under the action of the resultant pressure $P_1-P_2$ exerted on the piston 7, on the other hand by the counterpressure $P_4$ applied to the piston $7c$. The counterpressure $P_4$ follows the instantaneous variations of the difference $P_1-P_2$.

Figure 2:
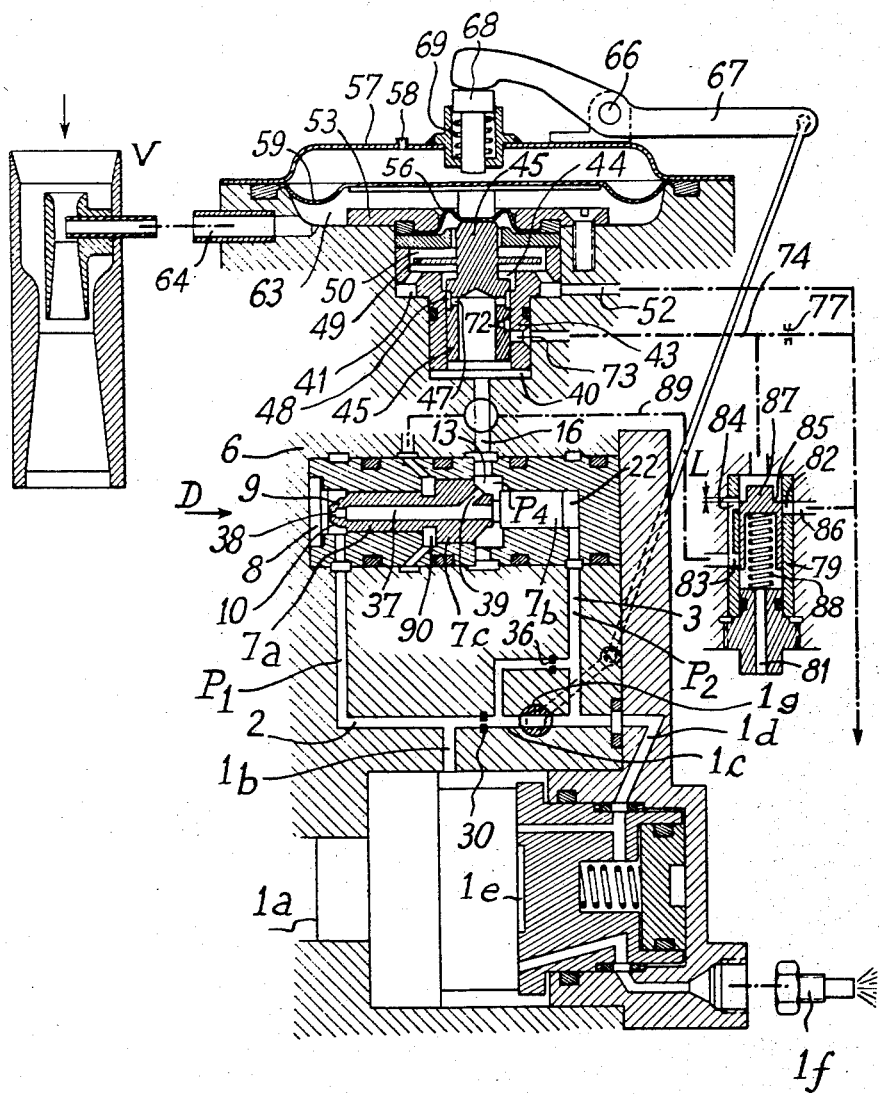
FIG. 2 shows a section through the assembly of a metering arrangement with which are associated corrector components for slowing down speeds and the driven engine speeds.

Referring to FIGURE 2, an advantageous embodiment of a device for carrying out the method according to the invention will now be described.

The lower part of FIGURE 2 shows the supply circuit of the injectors leaving the pump $1a$ and comprising the conduits $1b$, $1c$, $1d$, and the distributor $1e$ serving the injectors $1f$. On the path of the conduit $1c$ is inserted a fuel supply-metering jet 30, upstream and downstream of which are located pressure connections 2 and 3 which lead into a detecting and metering member D.

This latter comprises three consecutive coaxial cylinders in which slide a composite piston comprising three coaxial elements of different diameters $7a$, $7b$, $7c$. The pistons $7a$ and $7b$ have the same useful surface; the piston $7c$ has an appreciably larger surface; piston $7a$ is subjected, in a first chamber 10 into which the conduit 2 opens, to the upstream or instantaneous pressure $P_1$ of the pump; the piston $7b$ is subjected, in the chamber 22 into which the conduit 3 opens out, to the instantaneous downstream pressure $P_2$. As these two forces are in opposition, their resultant is proportional to $P_1-P_2$.

The piston $7a$ has at its end 9 exposed in the chamber 10, a small bearing surface pierced with a hole 38 of small diameter which communicates by an axial channel 37 with a chamber 13 in which the excess fuel flows; however, in order to take into account the small bearing surface around the hole 38, the piston $7a$ has a diameter which is slightly greater than that of the piston $7b$. The small bearing surface of the piston $7a$ may be applied to the base 8 of the cylinder or on a flat stop which is lodged therein, so as to close the hole 38, and then operates to control the flow of the fuel by a slight vibrating movement which opens and closes the hole 38 upon slight changes in pressure on the piston ends $7a$ and $7b$.

The pressure which prevails in the chamber 13 is the counterpressure $P_4$. It is exerted on the large diameter piston $7c$ and produces a force which is opposed to the resultant, proportional to $P_1-P_2$, of the forces exerted on the pistons $7a$ and $7b$.

The ratio of differential pressure $P_1-P_2$ to the counterpressure $P_4$ is equal to the ratio of the respective surfaces of the piston $7c$ and the piston $7a$. If, for example, this ratio is 2:5 and the difference in pressure $P_1-P_2$ is of the order of 10 kg. per sq. cm., the pressure in the chamber 13 will be of the order of 4 kg. per sq. cm., i.e., a low pressure.

The pressure $P_4$ in the chamber 13, where the excess fuel flows, depends at a given instant upon the quantity of fuel which has passed through the metering section, this quantity being a function of the variations in pressure upstream of the metering jet.

Consequently, the pressure points in the chamber 13 are produced at the same time as the pressure points upstream of the metering jet.

The arrangement which has just been described is known as a detecting and metering component and, in fact, constitutes a high pressure stage having a low pressure output.

A conduit 16 connects the low pressure chamber 13 with another member which comprises a piston 45 sliding in a cylinder 43 and subjected to the counterpressure $P_4$. A large diameter diaphragm 59 is subjected on one of its faces to the vacuum produced in a Venturi V located in the induction tube and transmitted through the conduit 64 to the chamber 63. The other face of the diaphragm 59 is subjected to atmospheric pressure by a hole 58 pierced in a casing 57 which protects the diaphragm. The force exerted by this vacuum acts in opposition to that exerted on the piston 45 by the pressure $P_4$.

These forces are related on the one hand with said pressures, and on the other hand with the surfaces of the diaphragm 59 and the piston 45. If the ratio of the surfaces is, for example, 30, it will be seen that the force exerted by a vacuum of the order of 135 g. per sq. cm. will permit the force exerted by a pressure $P_4$ of the order of 4 kg. per sq. cm. to be balanced.

The equilibrium of these two forces permits the output of the fuel from the metering piston to be regulated and consequently a mean pressure $P_4$ to be defined proportional to the average value of the vacuum in the Venturi, and thus to the average supply of air admitted to the engine.

To this end, the piston 45 is hollow and has a peripheral groove 48 communicating by at least one hole 47 with its interior, and thus with the chamber 40 containing pressure $P_4$.

This groove 48 communicates, in a suitable position of the piston 45, with a chamber 44 constituted by an enlargement of the bore of the cylinder 43, whilst permitting the flow of the metered fuel, which is then returned to the tank through a return conduit 52.

This component is completed by a damper, for example, in the form of a disk 49 moving in the chamber 50 whose diameter is slightly larger than that of the disc.

A dashpot which, in fact, constitutes a low pressure stage has just been described.

A corrector component utilized during the idle speed of the engine will now be described.

A light stroke stop cock $1g$ is placed across a metering jet 36 itself arranged in series with the jet 30, downstream of this latter. This stop cock $1g$ is controlled by the accelerator near the idle position so that in this position, it is closed and places the jet 30 in the effective circuit, in series with the idle jet 36.

The low pressure stage is completed by a push button 68 returned by a spring 69 and actuated by a lever 67 mounted to pivot at 66 and controlled at the same time as the stop cock $1g$ by the accelerator pedal; when the push button lowers the piston 45, it prevents the groove 48 from being exposed and it brings a groove 72 of the piston and an aperture 73 of the cylinder 43 into coincidence, said cylinder communicating through a channel 74 with the return conduit 52, after having passed through a small jet 77. In this position of the device, the fuel forced back by the pump is divided up into two currents, one of which, intended for the cylinders, passes through the jets 30 and 36 arranged in series, and the other of which, returned to the tank, passes through the fixed jet 77.

The device is further completed by an economiser which works when the vehicle drives the engine, by inertia or when rolling downhill. It comprises a cylinder 79 connected to the pipe 74 and in which a piston 87 slides, whose head, of diameter smaller than the diameter of the cylinder 79, blocks a lateral conduit 86 under the effect of a spring 88. The upper side edge 85 of the piston normally blocks the opening 82 of the conduit 86 connected to the return pipe. It also blocks another lateral aperture 84 connected by an axial groove to another aperture 83, itself placed in communication by a pipe 89 with a fourth chamber 90 of the central cylinder of the high pressure stage. The aperture 84 is uncovered slightly before the aperture 82, the difference resulting from a displacement L between the upper edges of these apertures.

The base of the cylinder 79 communicates with the atmosphere by an aperture 81. In the rest position, there is communication between the apertures 81 and 83, and thus between the chamber 90 and the atmosphere. The piston 87 interrupts this passage just before uncovering the aperture 84.

The above described regulating assembly permits a correct determination of the fuel delivered to the injectors, at a suitable pressure, due to the apparatus defining the counterpressure, which regulates at any instant the flow of the fuel and, consequently, the supply to the injectors, by balancing the difference in the upstream and downstream pressures of the metering jet. This is the role of the detecting and metering member which has been described as a high pressure stage, and, in fact, constitutes the essential metering device.

The operation of the apparatus is, in fact, as follows:

It has been seen that the pistons $7a$, $7b$ and $7c$ are balanced under the influence of the pressure $P_1$, pressure $P_2$ acting in opposite direction, on the pistons $7a$, $7b$, and of a pressure $P_4$ acting on the piston $7c$; the difference between $P_1$ and $P_2$ being applied on the surfaces $s$ of the pistons $7a$ and $7b$ is balanced by the pressure $P_4$ acting on the surface $s'$ of $7c$.

The counterpressure of the fuel flow output is determined in the low pressure stage by the levelling of the groove 48 with the lower level of the chamber 44. This levelling results from the balancing of the forces exerted on the one hand on the diaphragm 59 by the vacuum P and, on the other hand, on the surface $s''$ of the piston 45 by the metering pressure $P_4$.

All the time that the metering element 7 is closed, the counterpressure $P_4$ can increase, and, in the cylinders of the component D, can apply all the pistons $7a$, $7b$ and $7c$ more strongly against the base 8 of the cylinder in order to prevent the flow of the fuel. As soon as the piston 45 becomes level with the groove 48, the fuel flows towards the chamber 44; the counterpressure $P_4$ ceases to increase and is stabilised at a mean value depending upon the vacuum P.

The difference $P_1-P_2$ is itself established at the instantaneous value corresponding to this equilibrium.

If the vacuum beneath the diaphragm 59 decreases, the diaphragm tends to rise again therefore increasing the output of the metering element; this increase in leakage reduces the pressure $P_4$, and thus the application of the piston $7a$ on the base 8 of the cylinder, and a larger quantity of fuel is taken by the conduit 2 from the channel $1a$, this lowering the pressure $P_1$ and the supply of fuel to the injectors.

This is shown arithmetically in the following manner:

$$(P_1-P_2)s=P_4s'$$

$$P_4s''=PS$$

This giving, by eliminating $$P_4:(P_1-P_2)\frac{s}{s}=P\frac{S}{S''}$$

and, as the surfaces are fixed, one has: $P_1-P_2=K_P$ this bringing about the proportionality of the supply of fuel to the supply of air. An effective operation and a satisfactory mechanical arrangement have been produced with ratios:

$s'/s$ from 3 to 4 and $S/s''$ near 25

Other values could, however, be suitable for particular conditions of injection or air admission.

The operation which has just been described is applied to the whole speed range of the engine.

The idle speed corresponds to the circuiting of the metering jet 36 and the idle metering jet 77. The complete release of the accelerator pedal in fact controls the rotation of the stop cock $1g$ and at the same time the lowering of the push button 68, this preventing the misalignment of the groove 48 and on the contrary puts the cylinder 43 on the return circuit 74 by guiding the aperture or groove 72 in front of the aperture 73 of the circuit 74, thus using the idle metering jet 77.

In this operation, there is no air-fuel equilibrium since the supply of fuel only is adjusted.

The economiser is intended to avoid a considerable input of fuel to the injectors when the car drives the engine and when the accelerator pedal is released. Normally the fuel pump would in fact rotate at a speed greater than the declutched idle and send a supply of fuel which, on pasing through the jet 77, would create a very high pressure at 40 and at 13. A high pressure would thus be maintained in the conduit 1 and a considerable quantity of fuel would be discharged to the injectors.

The operation of the economiser is as follows:

The cylinder 79 and its piston 87 come into operation as soon as the pressure in front of the jet 77 reaches a predetermined value, the piston 87 is pushed back against the action of the spring 88 whilst establishing a communication 83, 89 with the fourth chamber 90 which, at normal speed, was connected to the atmosphere and in which now there is established a pressure equal to that of the chamber 13, this permits $P_1-P_2$ to again push the pistons $7a$, $7b$, $7c$ towards the right in order to make it possible for the fuel coming through the conduit 2 to flow. After a displachement corresponding to the clearance L, the piston 87 also uncovers the return conduit 82, adding a supplementary leakage which increases the drop in pressure and cuts the arrival of fuel sent to the injectors.

When the speed of the engine decreases, the piston 87 closes the pipe 89 and the idle conditions again prevail.

I claim:

1. A fuel metering device for metering the amount of delivered to injectors of an internal combustion engine having an air inlet with means for measuring the flow of air to said engine and a fuel feeding circuit with a pump for delivering fuel to said injectors; said fuel metering device comprising a calibrated jet inserted in said feeding circuit between said pump and said injectors; an hydraulic cylinder having a metering piston slidable therein; said metering piston having two end faces, respectively, fluidly connected to the upstream and downstream sides of said jet to thereby regulate the flow of fuel to the injectors in accordance with the pressure drop across said jet; a return circuit which applies a counterpressure formed in said return circuit downstream of said metering piston against said piston in such a manner that the resultant of the pressures applied to the two opposite end faces of said piston is made to vary in proportion to said counterpressure; said cylinder and piston including a variable passage formed therein for the passage of the fuel from the upstream face of the metering piston to said return passage, and means regulating said counterpressure whereby at normal running conditions of the engine the counterpressure produced is dependent on the weight of the air drawn into the engine.

2. The device of claim 1 having a thottling device operated by a diaphragm fluidly connected to the air inlet of the engine for producing said counterpressure.

3. The device of claim 2 further including a dashpot means connected to said throttling device for damping the movement of said throttling device.

4. The device of claim 1 including an enlarged annular portion having two opposite faces and formed on said piston between said end faces, and said counterpressure being applied against one face of this enlarged portion.

5. The device of claim 1 wherein said passage is formed in said piston and cooperates with a closed end of said hydraulic cylinder to thereby vary the flow of fuel therethrough.

6. The device of claim 1, wherein at idle speed of the engine the counterpressure in said return circuit is regulated by an additional metering jet fluidly connected to said return circuit.

7. The device of claim 6 including an enlarged annular portion having two faces and formed between said end faces on said piston, and said counterpressure being applied against one face of said enlarged portion.

8. The device of claim 7, wherein a second hydraulic cylinder having a second movable piston mounted therein is connected in parallel with said additional metering jet: said second movable piston controlling two stepped passageways which lead, respectively, to a fluid return passage and the other face of said enlarged portion of said metering piston to thereby completely stop the flow of fuel to said injectors when said engine is driven.

9. A fuel metering device for metering the amount of fuel delivered to injectors of an internal combustion engine having an air inlet with means for measuring the flow of air to said engine and a fuel feeding circuit with a pump for delivering fuel to said injectors; said fuel metering device comprising a calibrated jet inserted in said feeding circuit between said pump and said injectors; an hydraulic cylinder having a metering piston slidable therein; said metering piston having two ends faces, respectively, fluidly connected to the upstream and downstream sides of said jet to thereby regulate the flow of fuel to the injectors in accordance with the pressure drop across said jet; a return circuit having an additional metering jet contained downstream of said piston; said additional metering jet forming a counterpressure, when the engine is at idle speed, which counterpressure acts against said metering piston in such a manner that the resultant of the pressure applied to the two opposite end faces of the metering piston is made to vary in proportion to said counterpressure.

10. The device of claim 9, further including means which cooperates with said calibrated jet for varying the flow of fuel which flows through said calibrated jet.

11. The device of claim 10, in which said means cooperating with said calibrated jet comprises a fluid conduit, downstream of said calibrated jet, containing a valve means operated by means in connection with control means for the engine, and an idle jet for further restricting the flow of fuel through said calibrated jet; said valve means being operable to close said fluid conduit so as to direct the flow of fuel through said idle jet.

12. The device of claim 10, having a conduit connected to the return circuit upstream of said additional metering jet, said conduit being connected to an economiser means which completely cuts off the flow of fuel to the injectors when said engine is driven.

13. A fuel metering device for metering the amount of fuel delivered to injectors of an internal combustion engine having an air inlet with means for measuring the flow of air to said engine and a fuel feeding circuit with a pump for delivering fuel to said injectors; said fuel metering device comprising a calibrated jet inserted in said feeding circuit between said pump and said injectors; an hydraulic cylinder having a metering piston slidable therein; said metering piston having two end faces, respectively, fluidly connected to the upstream and downstream sides of said jet to thereby regulate the flow of fuel to the injectors in accordance with the pressure drop across said jet; a return circuit having a throttling device and an additional metering jet contained downstream of said piston, said throttling device operating, at normal speed of the engine, to apply a counterpressure against said piston in such a manner that the resultant of the pressures applied to the two opposite end faces of said piston is made to vary in proportion to said counterpressure; said additional metering jet being fluidly connected, at idle speed of the engine, to said piston to form the counterpressure which acts against said piston; means cooperating with said calibrated jet for varying the flow of fluid through said calibrated jet; and means mechanically connected to said means which cooperates with said calibrated jet and said throttling device for simultaneously operating said means cooperating with said calibrated jet, and said throttling device for varying the flow of fuel to the injectors.

References Cited

UNITED STATES PATENTS

| | | | |
|---|---|---|---|
| 2,422,808 | 6/1947 | Stokes | 123—119 |
| 2,447,261 | 8/1948 | Mock | 123—119 |
| 2,495,299 | 1/1950 | Tarter | 123—119 |
| 2,516,147 | 7/1950 | Robinson | 123—140.3 |
| 2,733,901 | 2/1956 | Sutton | 123—119 XR |
| 2,809,022 | 10/1957 | Chandler | 123—119 XR |
| 2,882,880 | 4/1959 | Reggio | 123—119 |
| 2,899,948 | 8/1959 | Groves | 123—119 |

LAURENCE M. GOODRIDGE, *Primary Examiner.*

U.S. Cl. X.R.

123—119